US011893908B2

(12) United States Patent
Wicken et al.

(10) Patent No.: US 11,893,908 B2
(45) **Date of Patent: *Feb. 6, 2024**

(54) MODULAR ADVERTISING SYSTEM

(71) Applicant: Balloon Innovations, Inc., Westminster, CO (US)

(72) Inventors: Christopher J. Wicken, Golden, CO (US); Gregg A. Wicken, Boulder, CO (US)

(73) Assignee: BALLOON INNOVATIONS, INC., Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,351

(22) Filed: Jan. 3, 2022

(65) Prior Publication Data

US 2022/0122495 A1 Apr. 21, 2022

Related U.S. Application Data

(63) Continuation of application No. 16/297,363, filed on Mar. 8, 2019, now Pat. No. 11,222,558.

(60) Provisional application No. 62/640,182, filed on Mar. 8, 2018.

(51) Int. Cl.
*G09F 17/00* (2006.01)
*G09F 15/00* (2006.01)

(52) U.S. Cl.
CPC .......... *G09F 17/00* (2013.01); *G09F 15/0037* (2013.01); *G09F 2017/005* (2013.01); *G09F 2017/0041* (2013.01)

(58) Field of Classification Search
CPC ................ G09F 17/00; G09F 15/0037; G09F 2017/0041; G09F 2017/005
See application file for complete search history.

(56) References Cited

U.S. PATENT DOCUMENTS 1,648,338 A * 11/1927 Gaines .................... B60R 13/00 248/230.8
1,653,083 A * 12/1927 Blaw ....................... E04H 12/32 248/541
2,072,573 A * 3/1937 Vigliotti ................. A63B 57/40 40/606.15

(Continued)

*Primary Examiner* — John Fitzgerald
*Assistant Examiner* — Tania Courson
(74) *Attorney, Agent, or Firm* — Berg Hill Greenleaf Ruscitti LLP

(57) ABSTRACT

The present invention provides a modular advertising system. One object of the current invention may be to provide a modular advertising system that may be secured to a pole or other external surface and elevated by a user to a desired height without the need of a ladder or lift. Another object of the current invention may also be to provide a quick-release assembly that may be used to quickly couple and de-couple the assembly from a pole or other external surface/structure. Another object of the current invention may be to provide a modular assembly that can be adaptable to a number of surfaces, such as a pole surface, ground surface or horizontal surface. An additional object of the current invention may be to provide a modular advertising display having interchangeable modular structures that may be configured to vary the position and number of advertising displays presented to consumers.

17 Claims, 9 Drawing Sheets

(56) References Cited

U.S. PATENT DOCUMENTS 2,922,252 A * 1/1960 Dam .................... A63H 27/10 446/221
3,081,734 A * 3/1963 Spahl .................... G09F 17/00 116/173
3,273,273 A * 9/1966 McLarty ................ G09F 17/00 116/173
3,920,207 A 11/1975 Adamaitis
4,878,303 A * 11/1989 Banniza ................ G09F 13/00 40/607.1
4,880,195 A 11/1989 Lepley
5,127,867 A * 7/1992 Lau ...................... G09F 19/00 446/221
5,203,530 A * 4/1993 Liu ...................... A63H 27/10 446/397
5,335,889 A * 8/1994 Hopkins ................ G09F 7/18 248/219.4
5,436,804 A * 7/1995 Henry ................... G03B 15/06 362/450
5,823,365 A * 10/1998 Page ................... A63H 27/10 211/13.1
6,038,802 A * 3/2000 Tidwell ............... G09F 15/0025 40/610
6,378,820 B1 * 4/2002 Mooney ............... G09F 17/00 40/604
6,584,928 B2 * 7/2003 Kinahan ............... G09F 17/00 40/591
7,213,356 B2 * 5/2007 Haggard, Jr. ....... G09F 15/0025 40/607.1
D562,406 S * 2/2008 Metzler ...................... D20/41
D584,363 S * 1/2009 Gordon ..................... D12/400
D612,774 S * 3/2010 Gordon ..................... D12/162
7,810,265 B2 10/2010 Beatty
8,037,630 B2 * 10/2011 Crookham ............ G09F 17/00 40/607.01
D659,200 S * 5/2012 Wicken ..................... D21/440
8,695,252 B2 * 4/2014 Urbina .................. G09F 17/00 40/607.01
8,968,047 B1 3/2015 Wicken et al.
9,087,462 B1 * 7/2015 Gallus .................. G09F 17/00
D754,522 S * 4/2016 Wicken ..................... D8/349
9,314,706 B1 * 4/2016 Wicken ................ A63H 27/10
9,352,240 B1 5/2016 Wicken et al.
9,399,176 B1 7/2016 Wicken et al.
9,679,504 B1 6/2017 Wicken et al.
9,833,722 B2 12/2017 Wicken et al.
9,855,511 B2 1/2018 Wicken et al.
9,965,981 B1 5/2018 Wicken et al.
10,005,205 B1 6/2018 Wicken et al.
10,065,126 B2 9/2018 Wicken et al.
10,124,268 B1 11/2018 Wicken et al.
10,679,529 B1 6/2020 Wicken et al.
10,850,206 B1 12/2020 Wicken et al.
10,973,325 B1 * 4/2021 Morgan ................ A47B 96/04
11,058,963 B2 * 7/2021 Wicken ................ A63H 27/10
11,222,558 B2 * 1/2022 Wicken ............. G09F 15/0037
11,430,355 B2 * 8/2022 Evans ...................... F16B 2/10
2001/0047603 A1 12/2001 Ross
2002/0073914 A1 * 6/2002 Kinahan ............... G09F 17/00 116/174
2003/0024144 A1 2/2003 Jen
2005/0167552 A1 * 8/2005 Tourtellotte ........... E01F 9/692 248/158
2007/0201844 A1 * 8/2007 Ealer .................... G03B 15/02 396/4
2007/0256341 A1 11/2007 McLaughlin
2008/0166942 A1 * 7/2008 Hou ...................... A63H 27/10 446/221
2009/0146029 A1 6/2009 Beatty
2010/0018095 A1 1/2010 Molla
2014/0096867 A1 * 4/2014 Cayton ................ A63H 27/10 141/98
2016/0220917 A1 8/2016 Wicken et al.
2017/0144077 A1 5/2017 Wicken et al.
2017/0287372 A1 10/2017 Ashworth et al.
2022/0223072 A1 * 7/2022 Wicken ................ G09F 19/008
2023/0029641 A1 * 2/2023 Wicken .................... G09F 7/22

* cited by examiner

MODULAR ADVERTISING SYSTEM

This U.S. Non-Provisional Application is a Continuation of, and claims benefit of and priority to U.S. Non-Provisional Application No. 16/297,363, filed Mar. 8, 2019, which claims the benefit of and priority to U.S. Provisional Patent Application No. 62/640,182, filed Mar. 8, 2018, the disclosures of which are incorporated herein by reference.

TECHNICAL FIELD

Generally, the inventive technology disclosed herein relates to a novel and unique modular advertising system. In a preferred embodiment, the invention may be used to position and support, for example, a display, such as a flag, balloon, or other marketing/advertising signs on a stationary pole or other external surface/structure. In another preferred embodiment, one or more modular display assemblies may be secured to a pole or other external surface at the level of a typical user and moved to, and secured in an elevated position without the need for a ladder and/or lift. In other embodiments, the invention may include interchangeable modular structures that may be configured to vary the position and number of advertising displays presented to consumers.

BACKGROUND

Traditional marketing displays, such as flags, are often placed in elevated positions to both generate a clear line of sight to potential consumers, as well as to make use of generally empty space thus maximizing the display's commercial impact without impeding the flow of consumers. Such traditional marketing displays, such as signage, flags, balloons, and even artistic presentations are often secured in elevated positions through simple supports, or simply being manually secured to existing structures. However, such traditional displays require a ladder or lift to allow them to be positioned at the desired elevations. In addition, traditional displays employ static and/or rigid display components which may break or become impractical in high wind or other adverse conditions.

Moreover, traditional display systems are difficult to position at elevated positions, and often require components to be permanently affixed, or affixed through screws and other similar means. Naturally, placement of such permanent components can be impracticable for metal structures such as stationary poles and the like. In addition, non-permeant couplings may lose their ability to support the display over time and require additional tightening or other maintenance, again typically requiring a user to use a ladder or other lift to reach the elevated position. This situation is not only impractical but potentially dangerous.

It is the object of the present invention to provide a modular advertising system to address the comprehensive concerns outlined above. One object of the current invention may be to provide a modular advertising system that may be secured to a pole or other external surface and elevated by a user to a desired height without the need of a ladder or lift.

Another object of the current invention may also be to provide a quick-release assembly that may be used to quickly couple and de-couple the assembly from a pole or other external surface/structure. Another object of the current invention may be to provide a modular assembly that can be adaptable to a number of surfaces, such as a pole surface, ground surface or horizontal surface. An additional object of the current invention may be to provide a modular advertising display having interchangeable modular structures that may be configured to vary the position and number of advertising displays presented to consumers.

Additional aims may further include: A modular advertising flag display comprising: at least one modular bracket configured to be capable of being secured around a pole; at least one angled bracket having at least one display holder and further configured to be coupled with the modular bracket through a modular insert coupler; a modular flag display secured by said display holder; a flexible extension connector configured to be coupled with a rod coupler on the angled bracket and further coupled with at least one installation rod; and a rod base support configured to secured said at least one installation rod and further be secured to said pole through one or more band clamps.

Additional aims may further include: A modular advertising flag display as described in wherein said modular flag display comprises a modular flag display having: an upper bracket coupled to a lower bracket by at least one installation rod wherein said installation rod is positioned within a support sleeve on the vertical axis of a flag; a stem positioned within a support sleeve on the top horizontal edge of said flag and further coupled with said upper bracket; and a stem positioned within a support sleeve on the bottom horizontal edge of said flag and further coupled with said lower bracket.

Additional aims of the invention may further include: A modular multi-flag advertising display comprising: at least one modular bracket configured to be capable of being secured around a pole; a plurality of angled bracket each having at least one display holder and further configured to be coupled with the modular bracket through a modular insert coupler; at least one modular flag display secured by each of said display holders of said angled brackets; a flexible extension connector configured to be coupled with a rod coupler on at least one of the angled bracket and further coupled with at least one installation rod; and a rod base support configured to secured said at least one installation rod and further be secured to said pole through one or more band clamps.

Additional aims of the invention may further include: A modular advertising display comprising: at least one angled bracket having at least one display holder; a modular flag display secured by said display holder; and at least one band clamp securing said angled bracket to a pole.

Additional aims of the invention may further include: A multi-flag modular advertising display comprising: a plurality of angled brackets each having at least one display holder; at least one modular flag display secured by each of said display holders of said angled brackets; and at least one band clamp securing said plurality of angled brackets to a pole.

Additional aims of the invention may further include: A modular balloon display comprising: an upper bracket coupled to a lower bracket by at least one installation rod wherein said installation rod is positioned within a support sleeve on the vertical axis of a flag; a stem positioned within a support sleeve on the top horizontal edge of said flag and further coupled with said upper bracket; and a stem positioned within a support sleeve on the bottom horizontal edge of said flag and further coupled with said lower bracket; wherein said upper bracket comprises an upper bracket having one or more angled display holders configured to secure at least one helium-free balloon configured to be coupled with said one or more angled display holders.

Additional objects of the present invention will become apparent through the detailed explanation below.

DETAILED DESCRIPTION OF INVENTION

Figure 1A:
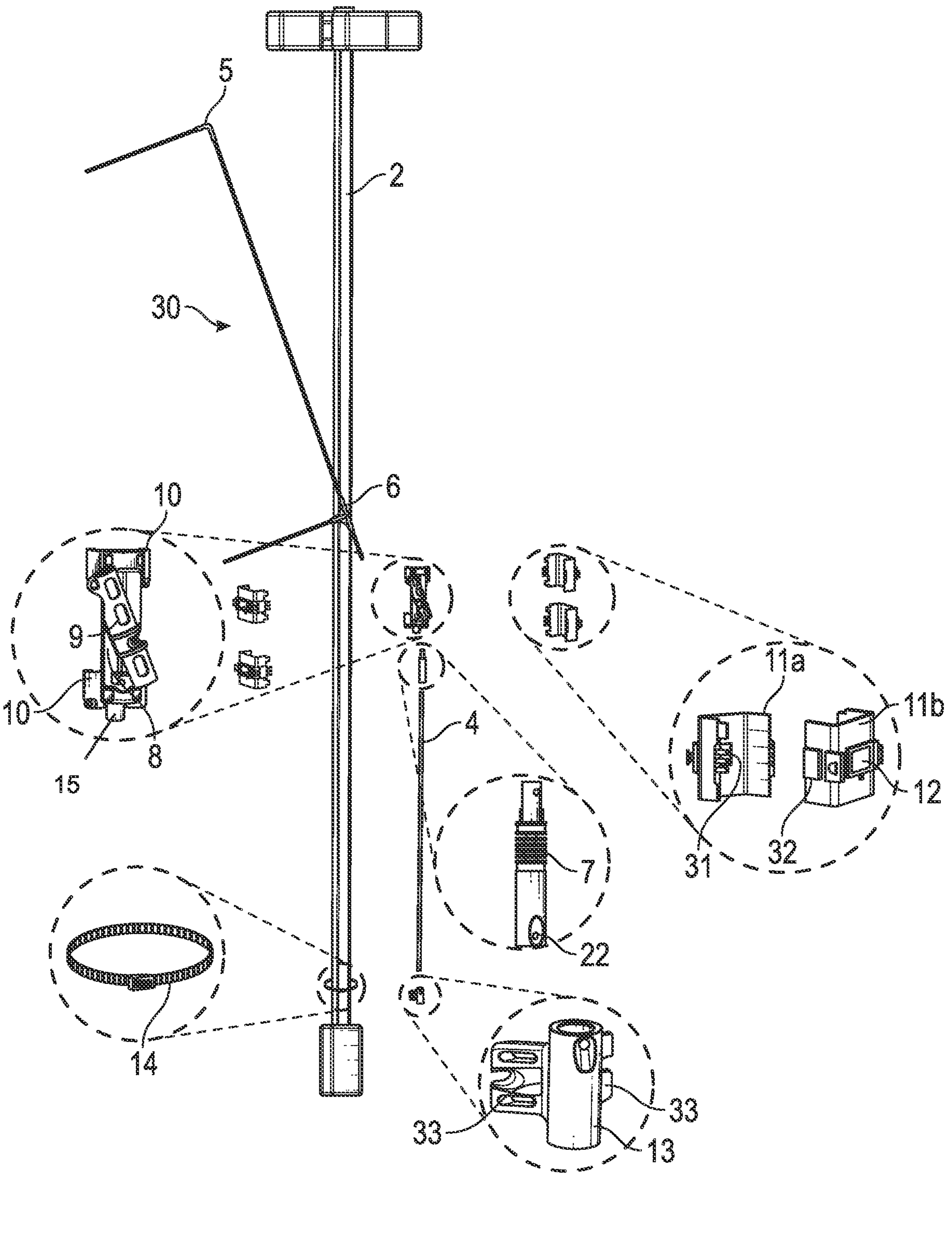
FIG. 1A: is a modular advertising system having an angled bracket coupler securable to a pole in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In one embodiment the present invention includes a modular advertising system (1) that may be coupled to a variety of surfaces and present one or more advertising displays. Generally referring to FIG. 1, in this embodiment, the invention may include a modular advertising system (1) configured to be coupled with the surface of a pole (2). In this embodiment, one or more modular brackets (11) may be coupled to a pole surface. In one embodiment, such a modular bracket (11) may be formed by interlocking a plurality of individual modular bracket components. Referring again to FIG. 1, in this preferred embodiment, a first modular bracket (11*a*) and second modular bracket (11*a*) component (generally referred to interchangeably as a "modular bracket") may be interlocked with one another around a pole (2). In an alternative embodiment, a modular bracket (11) may be hinged, such that it may be opened and placed around a pole (1) or other structure or surface, and perhaps secured with a lock or other fitting. In yet another embodiment, a plurality of modular brackets may be secured around a pole (2) or other structure with a lock, such as a snap lock, catch lock, twist lock, slide lock, quick-release lock or a button lock and the like. Such a lock may be integral with a first and second modular bracket (11) component, or it may be a physically separate locking element, such as a modular insert, such as an angled bracket (8) as will be discussed below. In one embodiment, a pole may include a square pole, a round pole, and an irregular shaped pole.

Again, referring to FIG. 1, in one embodiment a first modular bracket (11*a*) and/or a second modular bracket (11*b*) component may include one or more bracket guides (31). Such bracket guides (31) in the demonstrated embodiment may include a plurality of shaped projections that may be mated with a corresponding bracket slot (32). This configuration may not only increase the stability/strength of the coupling of the modular bracket components, but also ensure their proper orientation, for example when placed on a pole (2). In certain embodiments, the bracket slot (32) and bracket guide (31) may form a fitted connection, while in an additional embodiment such fitted connection may be a locked coupling, such as, for example a snap, twist or slide lock that may secure the position of the modular bracket components.

In one embodiment, a modular bracket (11) may have one or more modular insert couplers (12). Such modular insert couplers (12) may be configured to accept a variety of inserts, as will be discussed below, allowing a user to customize the modular advertising system (1) to include multiple displays in multiple configurations and arrangements, as well as in some cases a mix of different displays all at once. In one embodiment, a modular insert coupler (12) may include one or more bracket adaptors. In one embodiment, a first modular bracket (11*a*) and second modular bracket (11*b*) component may be interlocked with one another over a pole (6). Each bracket component may further include a modular insert coupler (12) that may be coupled with a corresponding insert adaptor on a modular insert which, in some embodiments may include an angled bracket (8), a blank modular insert, a modular balloon insert, or a modular insert that supports a variety of displays, signs or advertisements and the like.

In an additional embodiment, modular insert couplers (12) may be configured to couple with, and lock into place a variety of inserts, for example with an integral lock, such as a catch or snap lock and the like, or a separate locking mechanism. In one embodiment, a first modular bracket (11*a*) and second modular bracket (11*b*) may be interlocked with one another over a pole (2) and may further include and/or form one or more modular insert couplers (12). In this embodiment, each modular bracket component includes a portion of a modular insert coupler (12) such that when interlocked with another, the modular brackets may form a complete modular insert coupler (12) that may correspond to one or more modular inserts, such as an angled bracket (8).

Figure 1B:
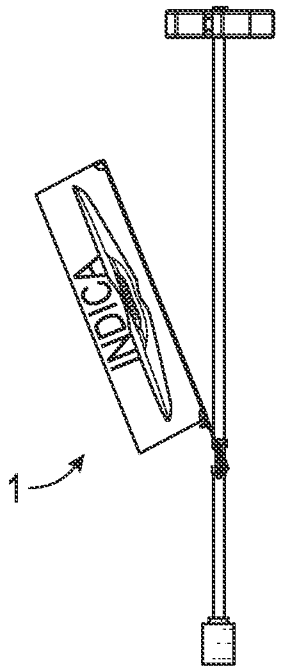
FIG. 1B: is a modular advertising system having an angled bracket coupler having a single as well as a plurality of flag display assemblies secured to a pole in one embodiment thereof.
Figure 1B:
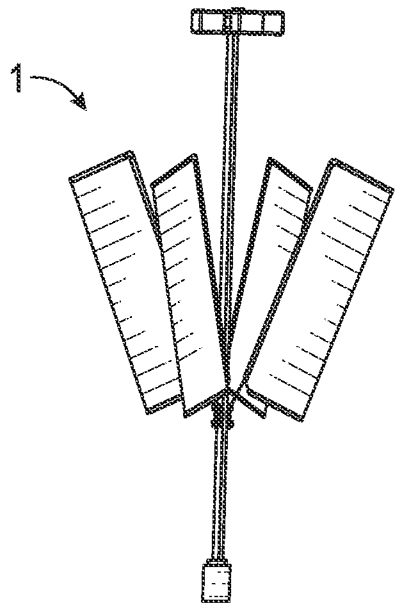
Figure 2:
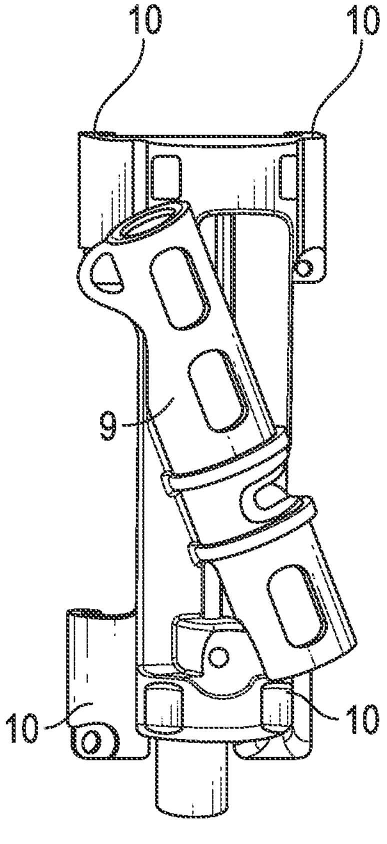
FIG. 2: is an isolated angled bracket coupler in one embodiment thereof.

In another embodiment, an angled bracket coupler (10) may be coupled with a modular bracket (11) forming a modular advertising system (1). As shown in FIG. 1, an angled bracket coupler (10) may include one or more display holders (9) that may be configured to secure one or more advertising displays, such as a flag (16). In this embodiment, an angled bracket (8) may be coupled with a modular bracket (11) by inserting the angled bracket coupler (10) on the angled bracket (8) into the modular insert coupler (12). Such embodiment is exemplary only, as a number of embodiments may allow for the angled bracket (8) to be coupled with a modular bracket (11) through mechanical apparatus such as a lock or other fitted configuration. In the preferred embodiment shown in FIG. 1, two bracket couplers (10) may be coupled to the surface of a pole (2) and further may secure an angled bracket (8). In this embodiment, one of the angled bracket couplers (10) on the top and bottom of the angled bracket (8) may be secured to a corresponding modular insert coupler (12) on a modular bracket (11).

As shown in FIG. 1, an angled bracket (8) may include a rod coupler be that may be coupled with an installation rod (4), or in some embodiments a flexible extension connector (7). Again, as shown in FIG. 1, an installation rod (4) or flexible extension connector (7) may be inserted into a rod coupler and secured with a coupler (22) or coupler lock (22) and support the modular insert (11) and by extension the associated modular advertising system (58). In a preferred embodiment, this coupler (22) may be a snap lock, a button lock, a slide lock, a twist lock, a fitted lock, or a catch lock and the like.

As further shown in FIG. 1, in this preferred embodiment, an installation rod (4) may be coupled with the angled bracket (8) supporting the modular advertising system (1), and may further be coupled with a rod base support (13) that may be secured to the pole (2). In this embodiment, the position of a modular advertising system (1) may be determined by the length of the installation pole (4), as well as the position wherein a rod base support (13) is secured to the pole (2). In this configuration it may be possible to secure a modular advertising system (1) to the bottom of a pole (2), or the approximate height of a typical user, and then couple the installation rod (4) with the corresponding modular advertising system (1), for example through a rod coupler (15) on the angled bracket (8), and then elevate the assembly to a desired height on the pole (2) and then secure the installation rod (4) with the rod base support (13) which may then be secured to the pole (2). In some instances, multiple installation poles (4) may be joined through the use of one or more internal coupler poles (18). In this embodiment, an internal coupler pole (18) may be inserted into an installation rod (4) and secured with a rod coupler, such as a snap or button lock. In some instances, an additional installation pole (4) may be secured over the other end of the internal coupler pole (18) and secured in a similar manner.

In some embodiments, a rod base support (13) may include an external attachment surface that may be configured to be secured with a pole (2) or other structure. This external attachment surface may be shaped to more closely conform to a desired surface. This external attachment surface may also include a magnetic external attachment surface, an adhesive external attachment surface or other frictional surface that may assist the rod base support (13) in conforming to, in this case, the external surface of a pole (1). As demonstrated in FIG. 1, a rod base support (13) may include one or more band apertures (33). In one embodiment, one or more band clamps (14) may be positioned through said band aperture (33) and secure a rod base support (13) to a pole (2) or other structure.

Figure 6:
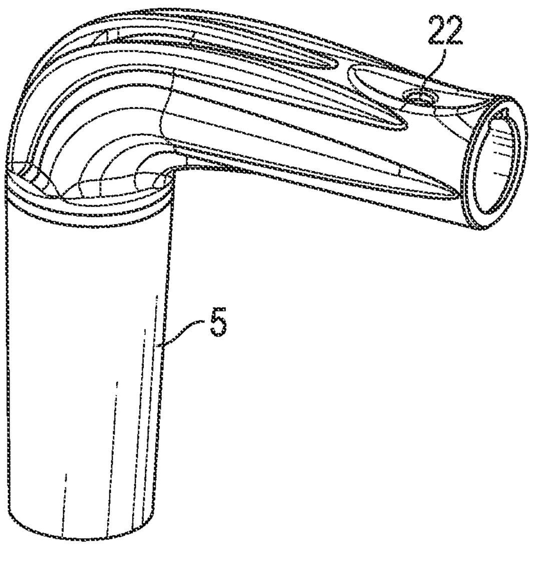
FIG. 6: is an isolated upper bracket of a flag display assembly in one embodiment thereof.

In one embodiment, the invention may include one or more modular flag displays (30). Generally referring to FIG. 4, in one preferred embodiment a flag (16) or other advertising display, such as a sign or banner (the terms being generally interchangeable) may be coupled with a modular flag display (30). In this embodiment one, or a plurality of installation rods (4) secured together by internal coupler poles (18), may be inserted into a support sleeve (17) along the length of the flag (16). In this embodiment, the installation pole (4) may be secured to an upper bracket (5) which may further be secured to an approximately horizontally positioned stem (3). As shown in FIG. 1, this stem (3) may be inserted into a horizontal support sleeve (17) along the top of the flag (16). As generally shown in FIG. 6, the installation rod (4) and stem (3) may be coupled with the upper bracket (5) through one or more couplers (22).

Figure 3:
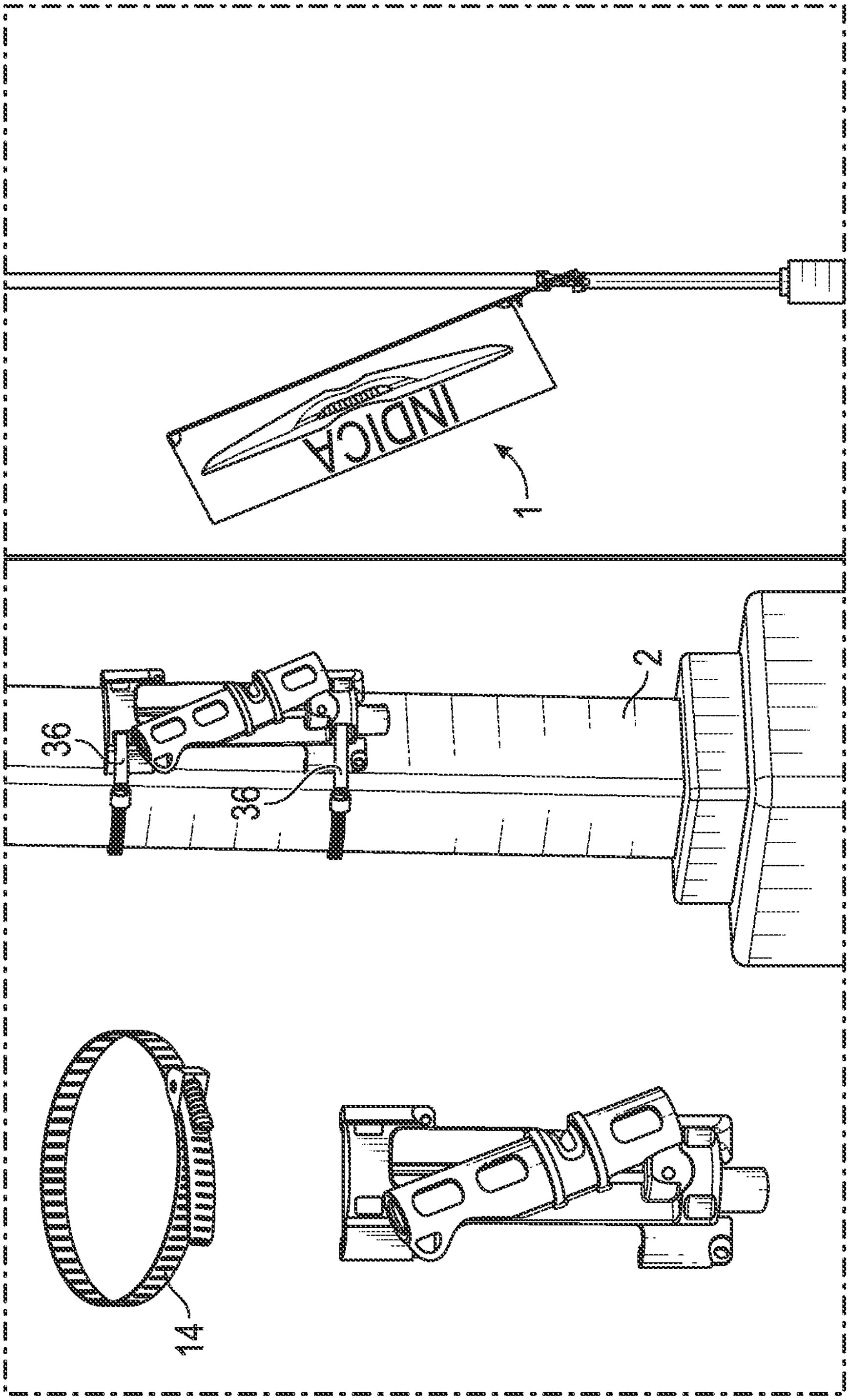
FIG. 3: on the left is an angled bracket coupler assembly, which is shown coupled directly to a pole surface in the middle image, and further securing a flag display assembly in the left image one embodiment thereof.
Figure 4:
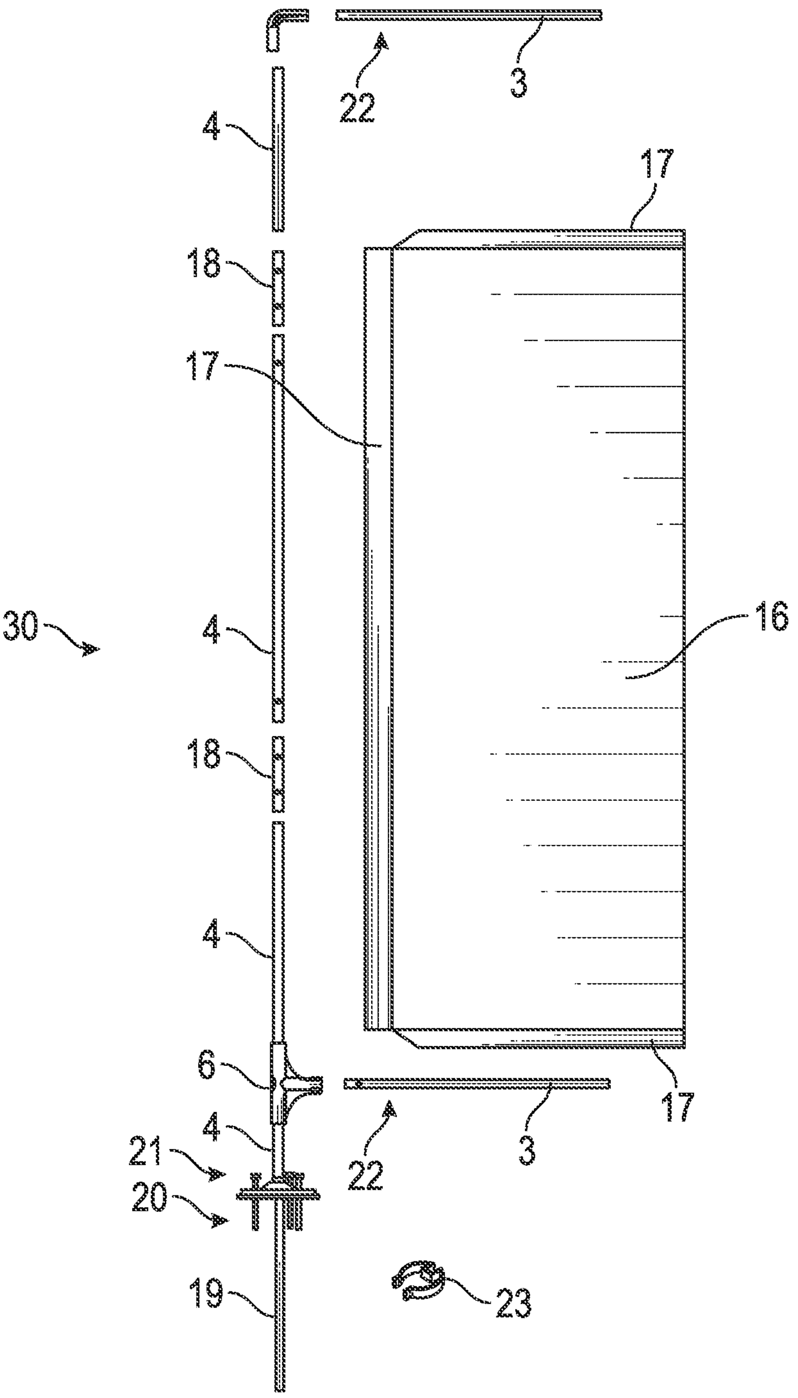
FIG. 4: is a blown-up version of a flag display assembly in one embodiment thereof.
Figure 5:
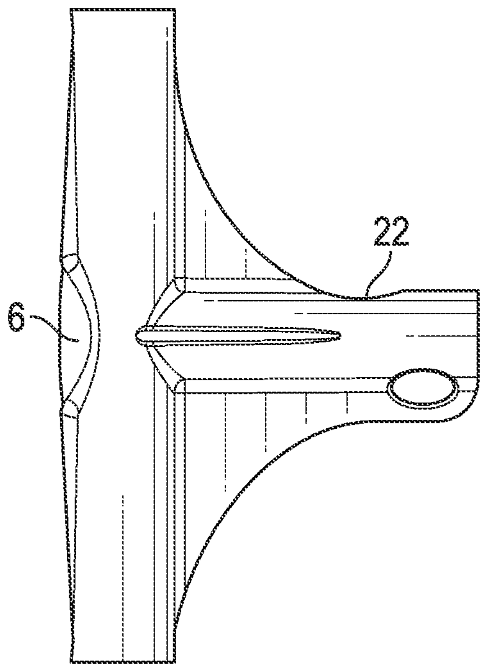
FIG. 5: is an isolated lower bracket of a flag display assembly in one embodiment thereof.

Again referring to FIG. 4, in this embodiment the installation pole (4) may also be secured to a lower bracket (6) which may also be secured to an approximately horizontally positioned stem (3). Similarly, this stem (3) may be inserted into a horizontal support sleeve (17) along the bottom of the flag (16). As generally shown in FIG. 4, the installation rod (4) and stem (3) may be coupled with the lower bracket (6) through one or more couplers (22). As also shown in FIG. 4, in this embodiment the lower bracket (6) may be coupled with an installation rod (4) that may be positioned with the display holder (9) of the angled bracket (8). In an alternative embodiment, multiple angled brackets (8) holding one or more modular flag displays (30) may form a modular advertising system (1). In another embodiment shown in FIG. 3, one or more angled brackets (8) may be coupled to a surface, in this case a pole (2) surface through one or more band clamps (14) threaded through band apertures (33). Similar to the embodiments, above this angled bracket (8) may secure a modular flag display (30) or other advertising display, such as a banner, sign or helium-free balloon.

In an alternative embodiment shown in FIG. 4, the lower bracket (6) may be coupled with an installation rod (4) that may be positioned over a ground stake (19) that may be secured into the ground. The installation rod (4) may be secured to the ground stake (19) through a pole clip (23) positioned over the installation rod and coupling the two elements together. The ground stake (19) may further be coupled with an adjustable support plate (21) similar to the self-adjusting support plate described in U.S. patent application Ser. No. 14/742,855, the entirety of which is incorporated herein by reference. In additional embodiment, installation rod (4) may be secured to a weighted base (not shown), while in still further embodiment, the installation rod (4) may be secured to a rod base support (13) that may be secured to a pole, or other surface.

Figure 7:
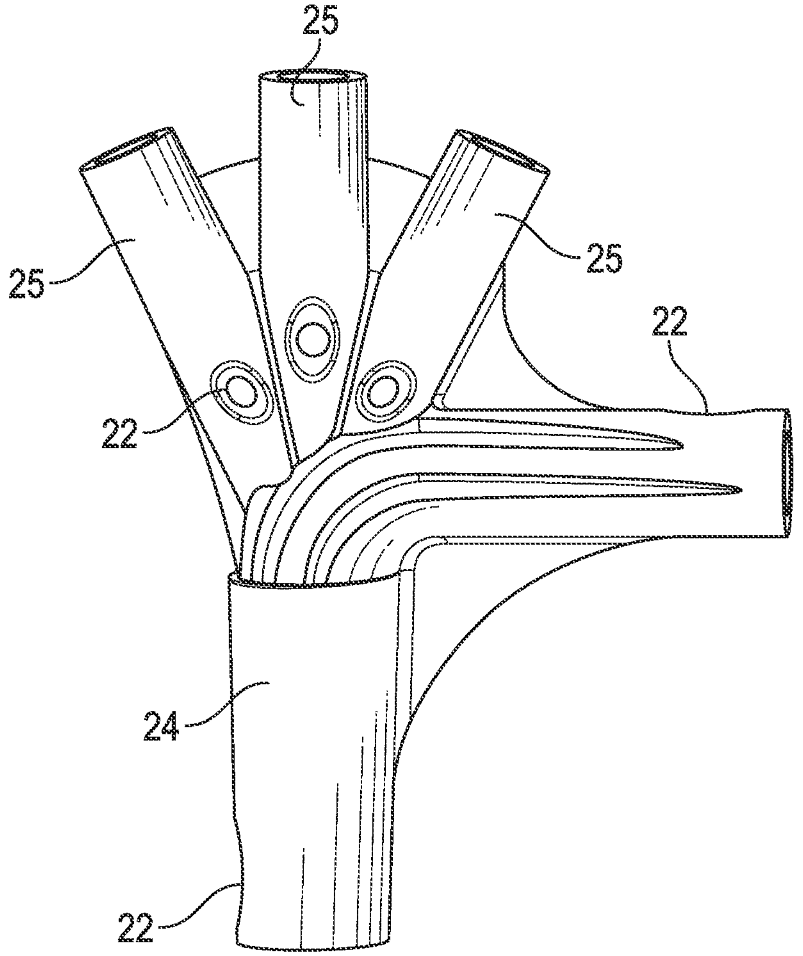
FIG. 7: is an isolated multi-angled upper bracket of a flag display assembly in one embodiment thereof.
Figure 8C:
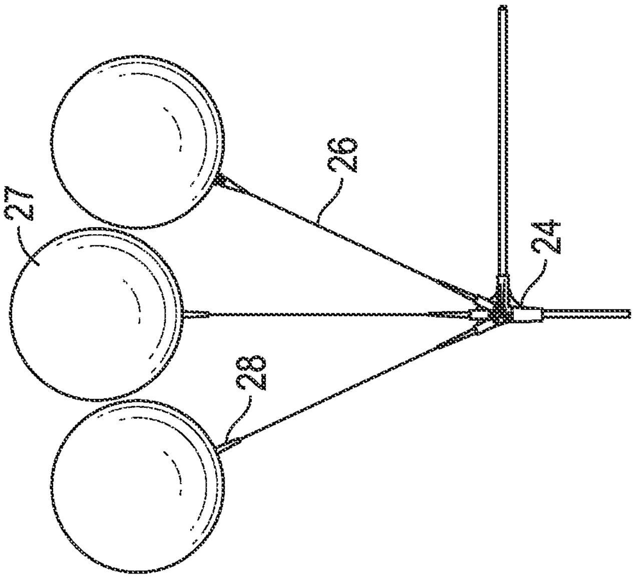
FIG. 8C: is a top portion of a flag display assembly having a multi-angled upper bracket coupled with a plurality of helium-free balloons in one embodiment thereof.
Figure 8B:
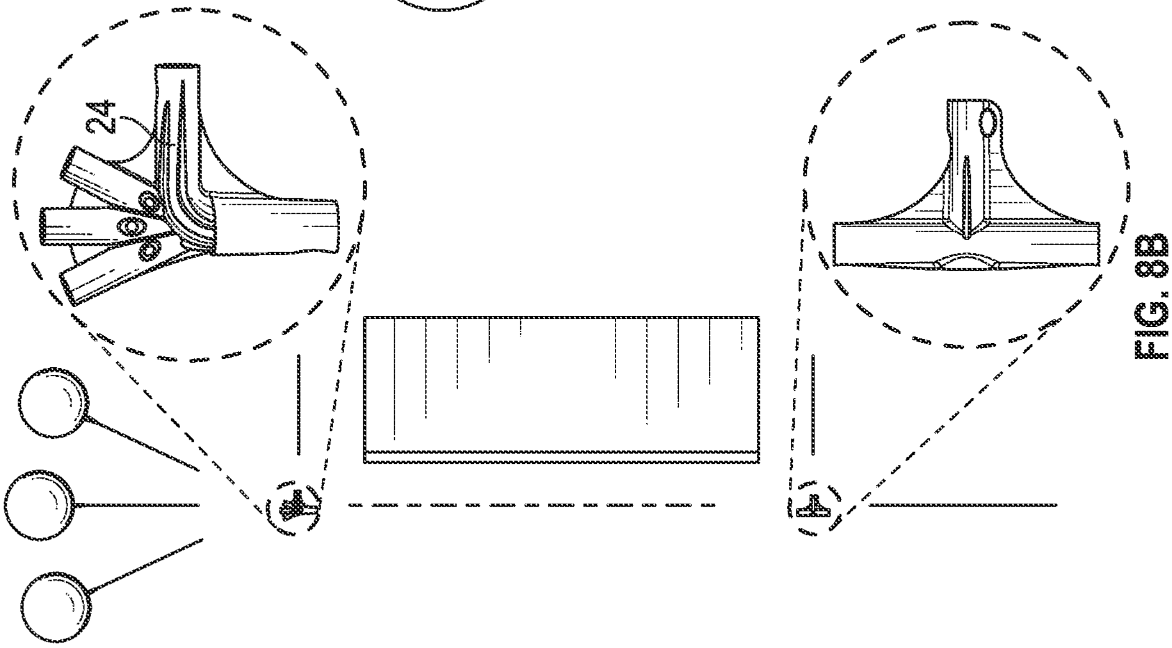
FIG. 8B: is a blown-up disarticulated view of a flag display assembly having a multi-angled upper bracket coupled with a plurality of helium-free balloons in one embodiment thereof.
Figure 8A:
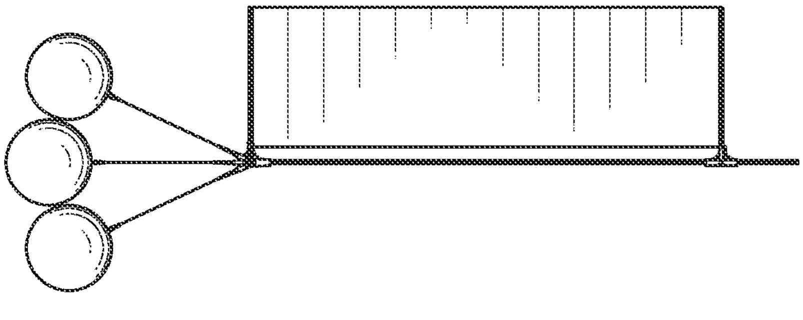
FIG. 8A: is a flag display assembly having a multi-angled upper bracket coupled with a plurality of helium-free balloons in one embodiment thereof.
Figure 9B:
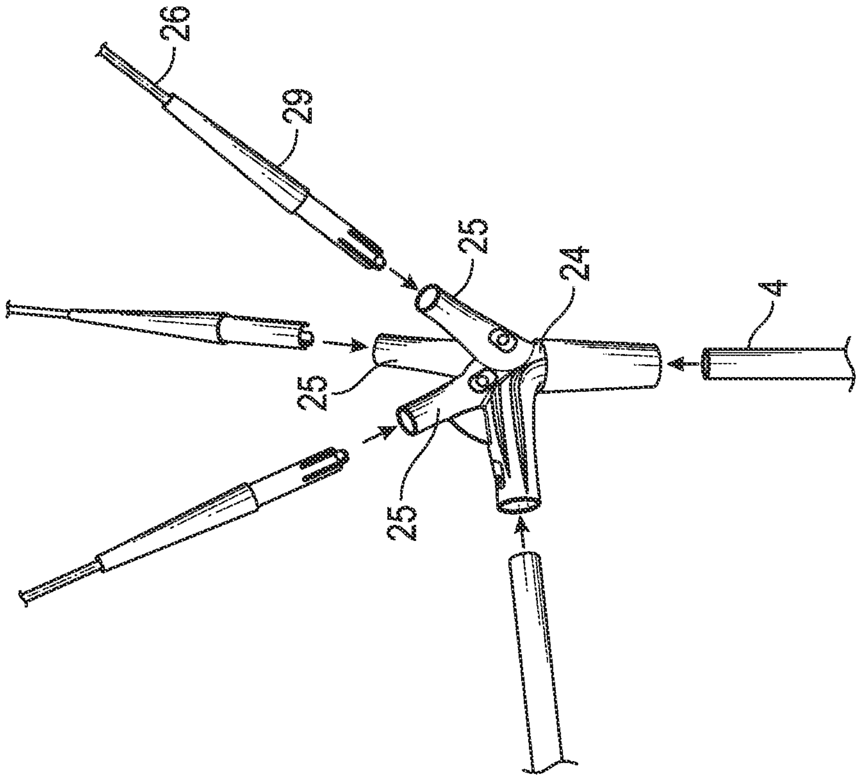
FIG. 9B: is a disarticulated view of a flag display assembly having a modified multi-angled upper bracket coupled with a plurality of helium-free balloons in one embodiment thereof.
Figure 9A:
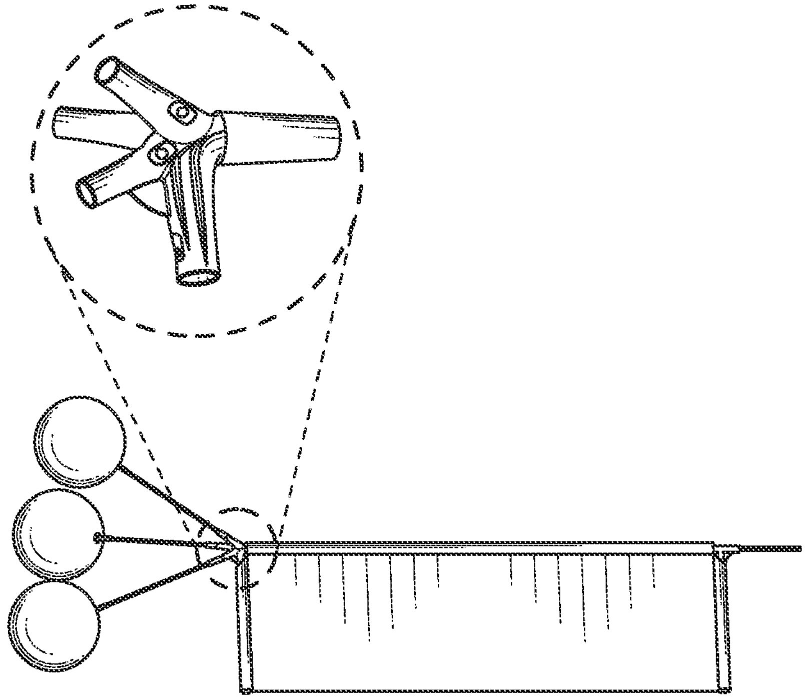
FIG. 9A: is a flag display assembly having a modified multi-angled upper bracket coupled with a plurality of helium-free balloons in one embodiment thereof.

In one embodiment, a modular advertising system (1) may include a multi-angled upper bracket (24) which may be configured to be coupled with one or more advertising displays. Generally referring to FIGS. 7-9, a multi-angled upper bracket (24) may include one or more angled display holders (25). In this embodiment, one or more angled display holders (25) may be positioned at variable angles so as to present any coupled advertising displays in a predetermined angle or cluster configuration. In the preferred embodiment shown in FIGS. 8-9, a multi-angled upper bracket (24) may include a plurality angled display holders (25) that may be coupled with a helium-free balloon (27) through a balloon stem (16). In this embodiment, a balloon stem may be made from a pliable material, such as fiberglass such that it may move in response to wind and other external forces providing the impression that the helium-free balloon (27) is floating, much like a lighter-than-air balloon. In certain embodiments, a balloon stem coupler (29) may be configured to secure the balloon stem (26) with an angled display holder (25), for example through a coupler (22) mechanism.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a modular advertising system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with one or more preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention may be described in some instances in method-oriented terminology, each element of the claims corresponds to a device and vice versa. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and/or device." Such changes and alternative terms are to be understood to be explicitly included in the description.

Thus, the applicant(s) should be understood to have support to claim and make a statement of invention to at least: i) each of the methods and/or apparatus for providing an modular advertising system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention; such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. A modular advertising display comprising:
- at least one angled bracket having at least one display holder;
- a modular flag display secured by said display holder;
- a flexible extension connector configured to be coupled with a rod coupler on the angled bracket and further coupled with at least one installation rod; and
- a rod base support configured to be secured with said at least one installation rod and a pole.

2. The modular advertising display as described in claim 1 wherein said modular flag display comprises a modular flag display having:
- an upper bracket coupled to a lower bracket by at least one installation rod wherein said installation rod is positioned within a support sleeve on the vertical axis of a flag;
- a stem positioned within a support sleeve on the top horizontal edge of said flag and further coupled with said upper bracket; and
- a stem positioned within a support sleeve on the bottom horizontal edge of said flag and further coupled with said lower bracket.

3. The modular advertising display as described in claim 2 and further comprising at least one internal coupler pole configured to be positioned within, and secure at least two installation rods.

4. The modular advertising display as described in claim 2 wherein said upper bracket comprises an upper bracket having one or more angled display holders.

5. The modular advertising display as described in claim 4 and further comprising at least one helium-free balloon configured to be coupled with said one or more angled display holders.

6. The modular advertising display as described in claim 5 and further comprising a balloon stem coupler configured to secure the helium-free balloon with the angled display holder.

7. The modular advertising display as described in claim 6 and further comprising a balloon stem configured to secure the balloon stem coupler with the helium- free balloon.

8. A multi-flag modular advertising display comprising:

a plurality of angled brackets each having at least one display holder;

at least one modular flag display secured by each of said display holders of said angled brackets; and a flexible extension connector configured to be coupled with a rod coupler on at least one angled bracket and further coupled with at least one installation rod; and a rod base support configured to be secured with said at least one installation rod and a pole.

9. The multi-flag modular advertising display as described in 8 wherein said modular flag display comprises a modular flag display having:

an upper bracket coupled to a lower bracket by at least one installation rod wherein said installation rod is positioned within a support sleeve on the vertical axis of a flag;

a stem positioned within a support sleeve on the top horizontal edge of said flag and further coupled with said upper bracket; and a stem positioned within a support sleeve on the bottom horizontal edge of said flag and further coupled with said lower bracket.

10. The multi-flag modular advertising display as described in 9 and further comprising at least one internal coupler pole configured to be positioned within, and secure at least two installation rods.

11. The multi-flag modular advertising display as described in 10 wherein said upper bracket comprises an upper bracket having one or more angled display holders.

12. The modular advertising flag display as described in claim 11 and further comprising at least one helium-free balloon configured to be coupled with said one or more angled display holders.

13. The modular advertising flag display as described in claim 12 and further comprising a balloon stem coupler configured to secure the helium-free balloon with the angled display holder.

14. The modular advertising flag display as described in claim 13 and further comprising a balloon stem configured to secure the balloon stem coupler with the helium- free balloon.

15. A modular balloon display comprising:

at least one angled bracket having at least one display holder;

a modular flag display secured by said display holder, the display further comprising:

an upper bracket coupled to a lower bracket by at least one installation rod wherein said installation rod is positioned within a support sleeve on the vertical axis of a flag;

a stem positioned within a support sleeve on the top horizontal edge of said flag and further coupled with said upper bracket;

a stem positioned within a support sleeve on the bottom horizontal edge of said flag and further coupled with said lower bracket; and wherein said upper bracket comprises an upper bracket having one or more angled display holders configured to secure at least one helium-free balloon configured to be coupled with said one or more angled display holders, a flexible extension connector configured to be coupled with a rod coupler on the angled bracket and further coupled with at least one installation rod; and a rod base support configured to be secured with said at least one installation rod and a pole.

16. The modular balloon display as described in claim 15 and further comprising a balloon stem coupler configured to secure the helium-free balloon with the angled display holder.

17. The modular balloon display as described in claim 16 and further comprising a balloon stem configured to secure the balloon stem coupler with the helium-free balloon.

* * * * *